United States Patent
Osborn

[19]

[11] Patent Number: 6,010,047
[45] Date of Patent: Jan. 4, 2000

[54] COMPACT DUAL ARM CONTAINER HOLDER

[75] Inventor: Thomas Ralph Osborn, Dearborn Heights, Mich.

[73] Assignee: General Motors Corporation, Detroit, Mich.

[21] Appl. No.: 09/169,858

[22] Filed: Oct. 10, 1998

[51] Int. Cl.$^7$ ...................................................... B60R 7/08
[52] U.S. Cl. ......................... 224/281; 224/282; 224/483; 224/926; 248/311.2
[58] Field of Search ..................... 224/926, 281, 224/282, 483; 297/188.17; 248/311.2

[56] References Cited

U.S. PATENT DOCUMENTS

| | | | |
|---|---|---|---|
| 4,783,037 | 11/1988 | Flowerday | 248/311.2 |
| 4,981,277 | 1/1991 | Elwell | 224/926 |
| 5,524,958 | 6/1996 | Wieczorek et al. | 297/188.7 |
| 5,692,658 | 12/1997 | Fischer et al. | 224/281 |
| 5,749,554 | 5/1998 | Avila et al. . | |
| 5,820,094 | 10/1998 | Tanaka | 224/926 |
| 5,823,410 | 10/1998 | Ackeret | 224/926 |
| 5,876,007 | 3/1999 | Lancaster | 224/926 |
| 5,897,089 | 4/1999 | Lancaster et al. | 224/926 |
| 5,899,426 | 5/1999 | Gross et al. | 224/926 |

FOREIGN PATENT DOCUMENTS

| | | | |
|---|---|---|---|
| 5213106 | 8/1993 | Japan | 224/282 |

*Primary Examiner*—Stephen P. Garbe
*Attorney, Agent, or Firm*—Kathryn A. Marra

[57] ABSTRACT

A container holder for vehicles includes a foldable assembly slidably received in a housing defined trough including a bottom and side members with an optional top wall. The assembly is stored in a folded position and is slidable out through a front end of the housing to an unfolded operative position ready to receive a container. The assembly includes a support member with a base and a pair of side walls pivotally mounted on the support member. Dual guide arms are pivotably mounted along upper edges of the side walls and are pivoted downward between the side walls in the stored position of the assembly. The arms have inner ends linked for simultaneous movement with the side walls. A resilient element, such as a spring, urges the side walls in an outwardly pivoting direction. Upon sliding of the base outward from the stored position to the operative position, the side walls are pivoted to angle outward and the guide arms are pivoted upward toward horizontal positions. Cut-outs in the arms form an opening for receiving a container between the outwardly angled arms for engagement with the base and restraint in an upright position within the container holder. Upon return of the base to the stored position, the side walls are forced inward by engagement with the side members of the housing, allowing the guide arms to pivot downward and fold the guide arms and side walls into the stored position within the trough formed in the housing.

9 Claims, 2 Drawing Sheets

COMPACT DUAL ARM CONTAINER HOLDER

TECHNICAL FIELD

This invention relates to container holders or cup holders for vehicles and, in particular, to holders mounted in a wall of a vehicle and moveable between open positions for receiving containers and closed positions wherein the container holder is hidden within the wall.

BACKGROUND OF THE INVENTION

In current automobiles and other vehicles it is well known to provide container holders or cup holders for holding drink containing cans, bottles and cups in positions of easy access for use by the driver and/or passengers of the vehicle. Such containers vary from simple recesses in a surface such as an arm rest or the back of a foldable seat to various mechanisms which provide an open or operative position in which the container holder is usable for its purpose and a closed or stored position where the container holder is recessed within a wall, such as the end of a console or an instrument panel member.

SUMMARY OF THE INVENTION

The present invention provides a container holder for vehicles including a foldable assembly slidably received in a housing defined trough including a bottom and side members. Preferably, a top wall is also included. The assembly is stored in a folded position and slidable out through a front end of the housing to an unfolded operative position ready to receive a container. The assembly includes a support member with a base and a pair of side walls pivotally mounted on the support member adjacent an inner end of the base. Dual guide arms are pivotably mounted along upper edges of the side walls and are pivoted downward between the side walls in the stored position of the assembly. The arms have inner ends linked for simultaneous movement with the side walls. Resilient means, such as a spring, urge the side walls in an outwardly pivoting direction.

Upon sliding of the base outward from the stored position to the operative position, the side walls are pivoted to angle outward and the guide arms are pivoted upward toward horizontal positions. Cutouts in the arms form an opening for receiving a container between the outwardly angled arms for engagement with the base for restraint in an upright position within the container holder. Upon return of the base to the stored position, the side walls are forced inward by engagement with the side members of the housing, allowing the guide arms to pivot downward to fold the guide arms and side walls into the stored position within the trough formed in the housing.

These and other features and advantages of the invention will be more fully understood from the following description of certain exemplary embodiments of the invention taken together with the accompanying drawings.

DESCRIPTION OF THE PREFERRED EMBODIMENT

Figure 1:
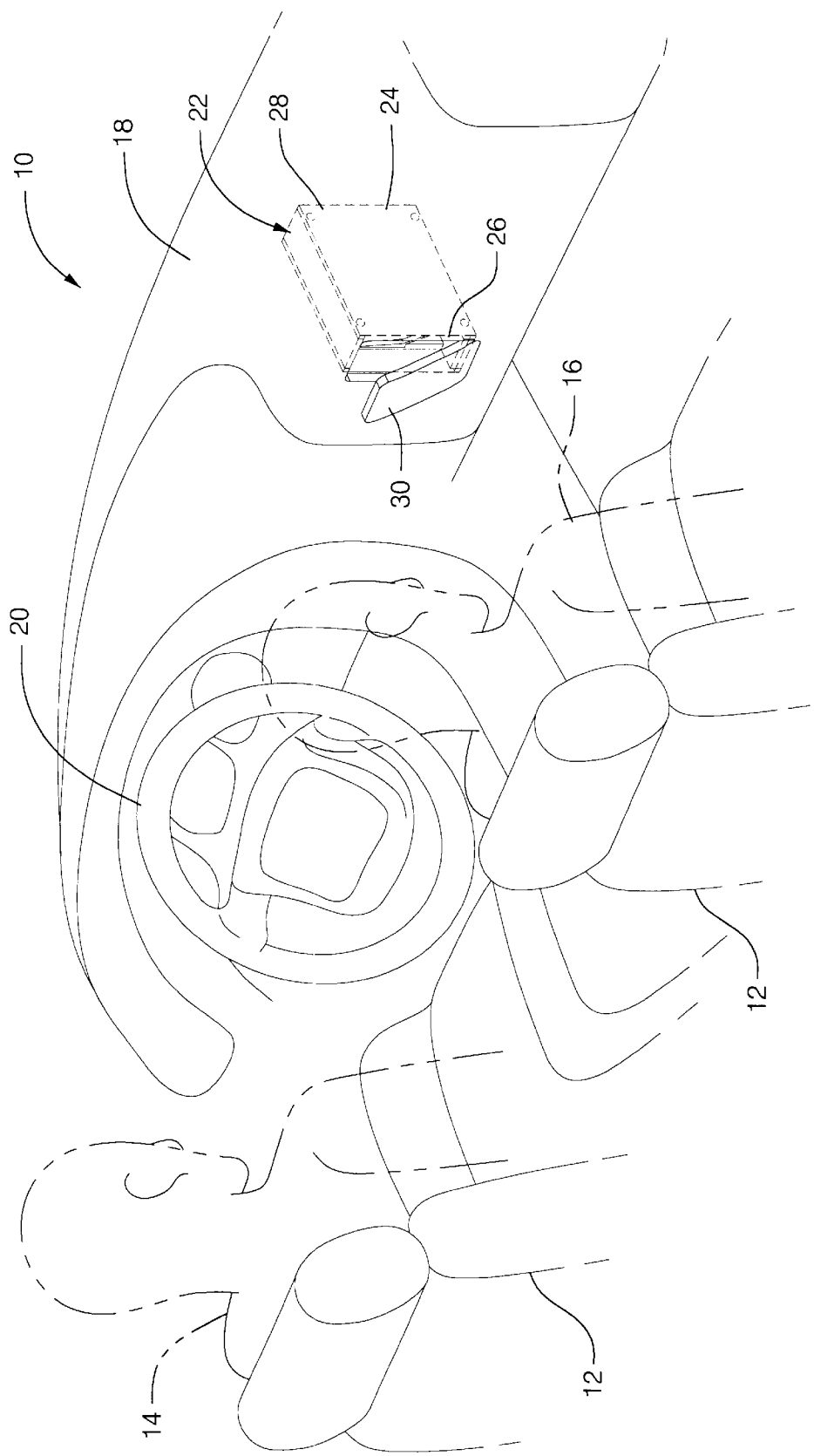
FIG. 1 is a pictorial view of a container holder of the invention mounted in an vehicle instrument panel within a vehicle passenger compartment.

Referring first to FIG. 1 of the drawings in detail, numeral 10 generally indicates a passenger compartment of an automotive vehicle having seats 12 in which a driver 14 and passenger 16 are seated behind an instrument panel 18 mounted forward of a steering wheel 20 positioned ahead of the driver. The steering wheel 20 and the instrument panel 18 may mount internally air bags, not shown, ahead of the driver 14 and passenger 16.

In accordance with the present invention, a container holder 22 is mounted in the instrument panel 18 laterally between the driver 14 and passenger 16 but hidden, in a stored position, within the instrument panel structure. The holder 22 includes a housing 24 which may form a part of the instrument panel 18 or may be formed separately as shown and mounted in the panel 18. The housing has an open exposed end 26 and a hidden end 28 which may be open or closed as desired. The exposed end may be closed or hidden by an outer cover 30 mounted upon the housing 24 or pivoted directly to the instrument panel as illustrated in FIG. 1 in a partially open position. The container holder 22 may be made with any suitable materials and processes.

Figure 3:
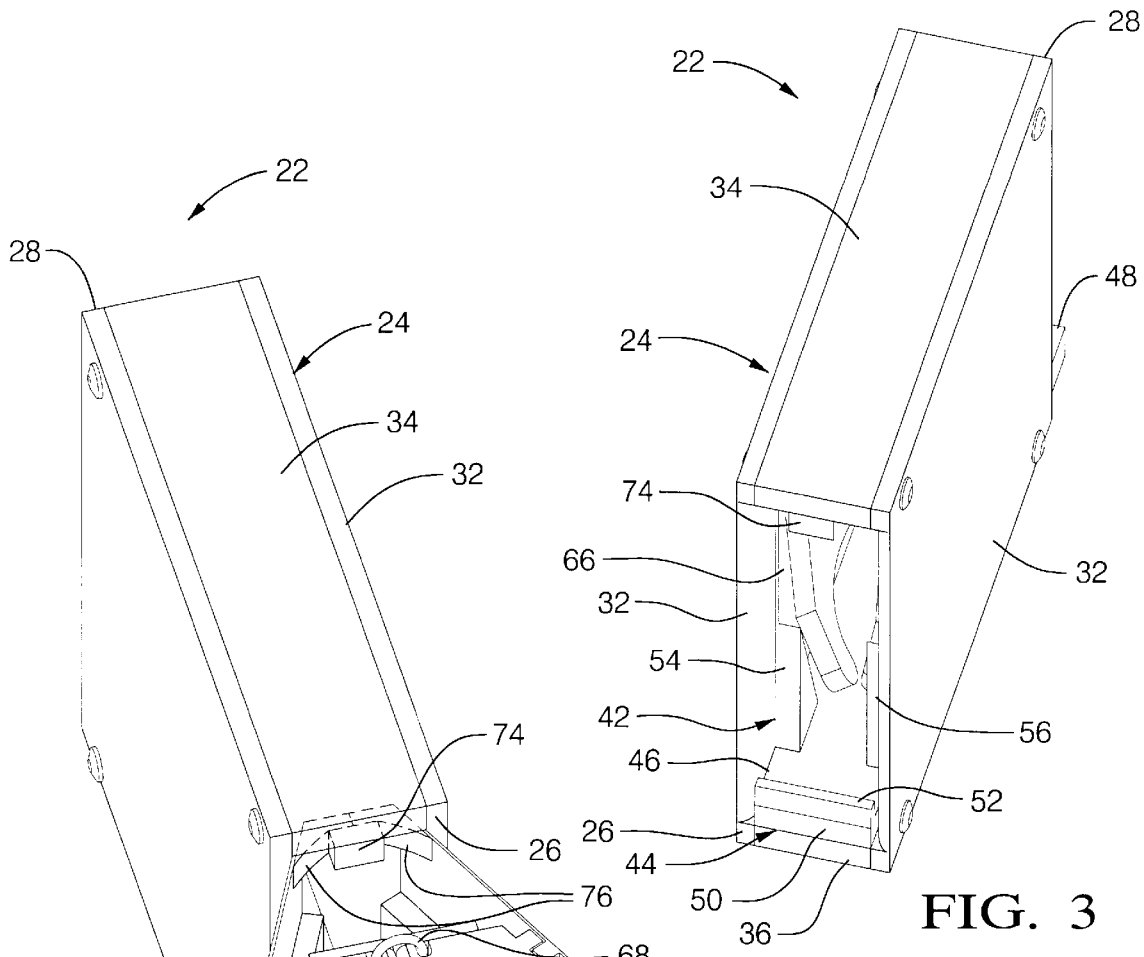
FIG. 3 is an isometric view of the container holder of FIG. 2 with the foldable assembly shown retracted in a stored position.
Figure 2:
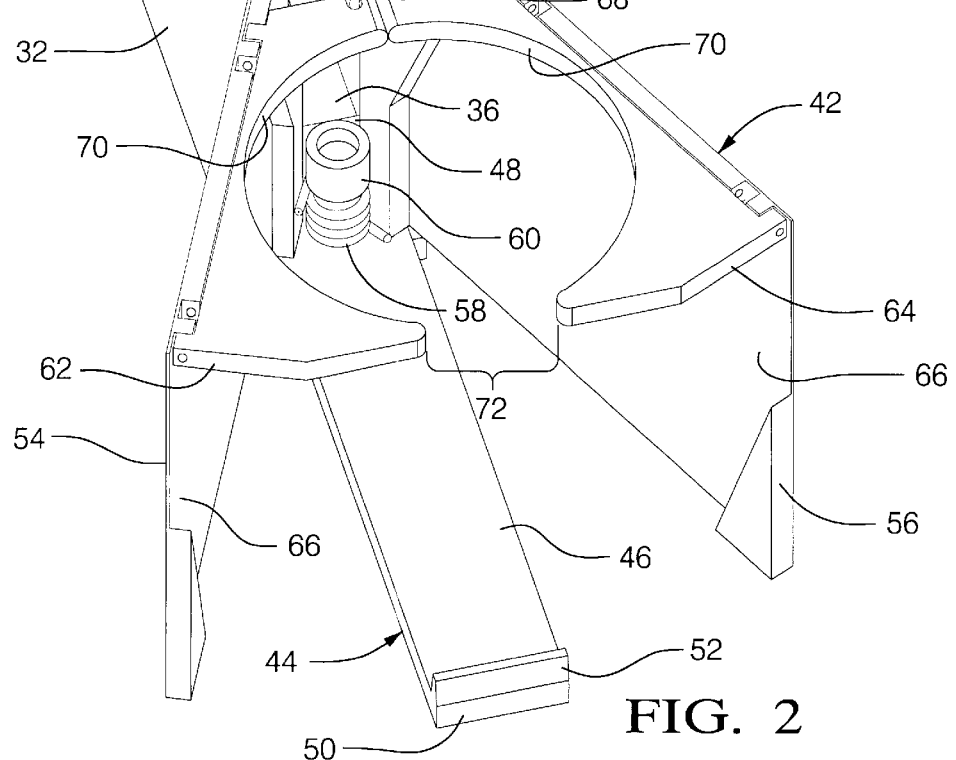
FIG. 2 is an isometric view of an unmounted container holder, with cover omitted, and a foldable assembly shown extended in an operative position.

FIG. 2 shows an exemplary embodiment of the container holder in an unfolded and operative position and having the cover 30 deleted for clarity. FIG. 3 shows the same embodiment in a folded and stored position. The housing 24 is assembled from two spaced side panels or side members 32 secured at upper and lower ends to a top wall 34 and a bottom 36, respectively. The bottom 36 and the side members 32 form a relatively narrow elongated trough which is closed by the top wall 34 and in which a foldable assembly 42 is received in the stored position of the holder 22.

The foldable assembly 42 includes a support member 44 which includes, at a minimum, a base 46 formed, in this instance, as a narrow flat plate having inner and outer ends 48, 50 with a raised lip 52 at the outer end 50 to act an a finger engagable pull. Any other suitable form of pull device may be substituted as desired. A pair of side walls 54, 56 are pivotally mounted on pins, not shown, extending upward from laterally spaced points adjacent the inner end 48 of the base 46. A helical torsion spring 58 wound around a headed pin 60 biases the side walls 54, 56 outward into engagement with the side members 32 when in the stored position.

Dual guide arms 62, 64 are pivotally mounted along upper edges of side walls 54,56, respectively. The guide arms are pivotable downward along inner sides of their respective side walls when the assembly 42 is in the stored position. The side walls 54, 56 are provided with recessed portions 66 for receiving the guide arms flat against the wall sides. Inner ends of the guide arms are pivotally linked by a hinge or any other suitable means, for example by resilient ring 68, to provide simultaneous motion thereof. Each of the guide arms 62, 64 includes an arcuate cutout 70 opening to an inner side The cutouts cooperate to define a generally circular opening sized to receive a container such as a bottle, can or mug. Outer ends of the guide arms are spaced to define a gap 72 wide enough to allow passage of the handle of a mug or cup.

If desired, the holder 22 may include stop means for limiting outward travel of the foldable assembly 42 to normally retain it within the housing. For example, a depending lug 74 may depend from an outer end of the cover 30 and be engaged by angled stop elements 76, shown in phantom and extending laterally inward from the inner ends of the side walls 54, 56 when opened to their operative positions. To remove the assembly 42 from the housing, the side walls may be manually forced together, causing the stop elements 76 to move outward so that they clear the lug 74 when the assembly 42 is drawn out from the housing 24. A finger pull, such as the raised lip 52 formed on the outer end 50 of the base 46, is preferably provided to draw the folded assembly 42 from the housing 24. If desired, the support member could also include a rear wall, not shown, extending up from the inner end of the base 46 to close the hidden end 28 of the housing 24. Such a rear wall could also be made to pivotally support the side walls, if desired.

In use, the container holder 22 may be mounted in any vehicle wall portion which is deep enough to receive the holder, for example, an instrument panel, console or seat support. The housing 24 may be formed separately and installed in the wall portion or may be formed with the wall portion as desired. The cover 30 may be attached to the vehicle wall portion or directly to the bottom 36, side member 32 or top wall 34 of the housing as desired.

When stored, the foldable assembly 42 is folded and slid completely into the housing 24 as shown in FIG. 3. To move the holder out to the operative position shown in FIG. 2, the user grasps the lip 52 with a finger and draws the assembly 42 outward. As the assembly slides out of the housing 24, the spring 58 urges the side walls 54, 56 outward. They open to a predetermined angle when their pivot points reach the outer ends of the side members 32, which are preferably rounded to provide easy sliding of the side walls into and out of the housing 24. As the side walls 54, 56 open, they raise up the guide arms 62, 64 to near, but slightly below, a horizontal position, limiting further outward motion of the side walls.

In the operative open position, a bottle, can, mug or other properly sized drink container may be placed in the holder 22 through the opening defined by cutouts 70. The bottom of the container will be supported on the base 46 of the assembly 42 and is restrained against lateral motion by the angled side walls 54, 56. The guide arms 62, 64 also provide lateral as well as longitudinal restraint, preventing the container from tipping in the holder 22. If the container has a side handle, as does a cup or mug, the handle may be received through the gap 72 between outer ends of the guide arms, thus allowing the container to be seated properly on the base 46 of the holder 22.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

We claim:

1. A container holder for use in automotive vehicles and the like, said holder comprising:
    a housing having a bottom and a pair of side members extending upwardly from the bottom to define a relatively narrow elongated trough having front and rear ends;
    a foldable assembly slidably received in the trough in a folded stored position and slidable out through the front end of the housing to an unfolded operative position wherein said assembly is positioned for receiving a container;
    a support member in the assembly and including a base slidable on the bottom of the housing and having inner and outer ends;
    a pair of side walls in the assembly and engagable with the side members of the housing when in the folded position wherein said walls have inner ends pivotably supported adjacent the inner end of the base and outer ends engagable with the side members of the housing adjacent the front end of the housing;
    resilient means in the assembly for urging the side walls in an outwardly pivoting direction; and
    dual guide arms in the assembly, said guide arms pivotably mounted along upper edges of respective side walls and pivoted downward alongside their respective side walls in the stored position, said arms having inner ends linked for contemporaneous upward pivotal motion toward horizontal orientation in said operative position of the assembly and including container receiving cutouts in adjoining edges of the arms outward of said inner ends;
    whereby, upon sliding of said base outward from said stored position to said operative position, the side walls are pivoted outward and the guide arms are pivoted upward causing the cutouts to form a container receiving opening for receiving a container within the opening for engagement with the base between the side walls so that the container is restrained in an upright position within the container holder; and, upon returning of the base to the stored position, the side walls are forced inward by engagement with the side members of the housing, allowing the guide arms to pivot downward to fold the guide arms and side walls into the stored position within the trough formed in the housing.

2. A container holder as in claim 1 wherein said housing includes a top wall connecting upper edges of the side members and covering said assembly in the stored position.

3. A container holder as in claim 2 wherein said holder includes an outer cover.

4. A container holder as in claim 1 wherein said side walls are pivotably supported on said base.

5. A container holder as in claim 1 including finger engagable means on said assembly for moving the assembly between the stored and operative positions.

6. A container holder as in claim 1 wherein said finger engagable means are fixed to the base.

7. A container holder as in claim 1 wherein said resilient means for urging the side walls in an outwardly pivoting direction is a spring.

8. A container holder as in claim 1 and including stopping means preventing outward sliding of the foldable assembly beyond the operative position.

9. A container holder as in claim 1 wherein said dual arms include outer ends spaced in the operative position to form a gap for receiving a handle of a mug or cup placed within the holder.

* * * * *